Jan. 26, 1954  J. O. MOORHEAD ET AL  2,667,553
HERMETICALLY SEALED THERMOSTAT
Filed Sept. 25, 1951

*Inventors:*
John O. Moorhead,
Edward F. Kurtz,
Robert M. Glidden,
by Townsend M. Gunn
 Att'y.

Patented Jan. 26, 1954

2,667,553

UNITED STATES PATENT OFFICE 2,667,553

HERMETICALLY SEALED THERMOSTAT

John O. Moorhead and Edward F. Kurtz, Attleboro, Mass., and Robert M. Glidden, Haddonfield, N. J., assignors to Metals & Controls Corporation, Attleboro, Mass., a corporation of Massachusetts Application September 25, 1951, Serial No. 248,222

9 Claims. (Cl. 200—138)

This invention relates to thermostatic switches, and in particular to thermostatic switches of the hermetically sealed type.

The general object of this invention is to provide a thermostatic switch and electrical connections thereto which can reliably operate in the presence of frost or moisture condensation.

A specific object of the invention is to provide a thermal switch of the hermetically sealed type in which the electrical connections to the device are sealed off from deleterious films of water or vapors. Another specific object of the invention is the provision of a hermetically sealed thermostatic switch of the type described above of the greatest simplicity and lowest cost. Other objects and advantages will be in part obvious and in part pointed out hereinafter.

The invention accordingly comprises the elements and combination of elements, features of construction, and arrangements of parts which will be exemplified in the structures hereinafter described, and the scope of the application of which will be indicated in the following claims.

In the accompanying drawings, in which is illustrated one of the various possible embodiments of the invention:

Similar reference characters indicate corresponding parts throughout the several views of the drawing.

There are instances in which thermostatic switches must be used under adverse conditions so far as moisture is concerned. One of these, for example, is in the interior of electric refrigerators where there is present a certain amount of moisture in the air, which condenses and freezes on the evaporator or any other surfaces of sufficiently low temperature. In such a case, where the switch must be mounted in thermal contact with the evaporator of the refrigerator, provision must be made to prevent short-circuits or grounds due to the moisture or frost that collects on the evaporator and on the thermostat, and to prevent the corrosion of the thermostatic switch parts or the contamination of the electrical contacts. This moisture might either get into the thermostat itself, or collect on the exterior electrical connections of the device. In either event, short circuits or ground connections might result, or improper operation of the thermostat.

In order to avoid this trouble, it has been customary to use a temperature-responsive device in which the sensing element in contact with the evaporator is a bulb containing an expanding medium such as gas or fluid with an associated pressure-sensitive switch mounted in a place where there is no harmful moisture or frost. Others have tried hermetically sealed thermostatic switches, these being mounted upon the refrigerator evaporator. In the construction of such hermetically sealed thermostatic switches, it has been hitherto either difficult or relatively expensive to prevent the aforementioned short circuiting or grounding at the electrical connections and has been difficult to construct a low-cost unit that has been sufficiently well hermetically sealed. This invention proposes to overcome these difficulties, and provides a low cost unit which is adaptable to being manufactured in large quantities.

Figure 1:
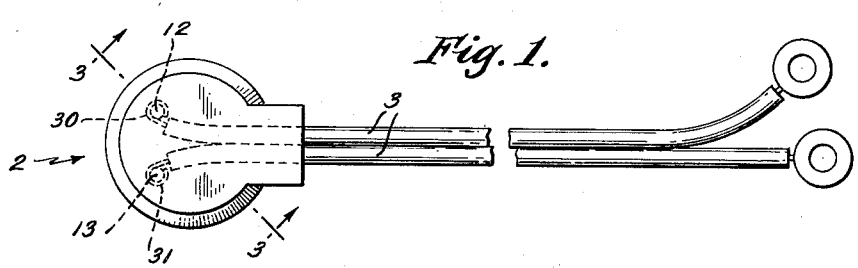
Fig. 1 is a plan view showing the top of one embodiment of the switch of this invention with its associated electrical lead-in wires.
Figure 2:
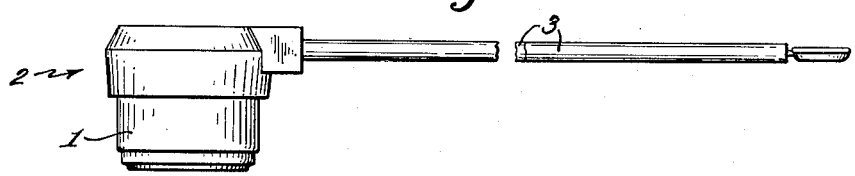
Fig. 2 is a side view of Fig. 1 showing certain constructional details.

Referring now to the drawing, there is shown in Figs. 1 and 2 the top and side views respectively of one embodiment of a switch of the present invention. The switch basically comprises a container 1 made of metal and containing the contact making and breaking parts, and a cap, indicated generally by 2, hermetically sealed thereto. Lead-in connectors 3 are so mounted in respect to cap 2 that the electrical and moisture insulation means 32 on lead-in connectors 3 become solidly bonded to the electrical and moisture insulating means of cap 2.

Figure 3:
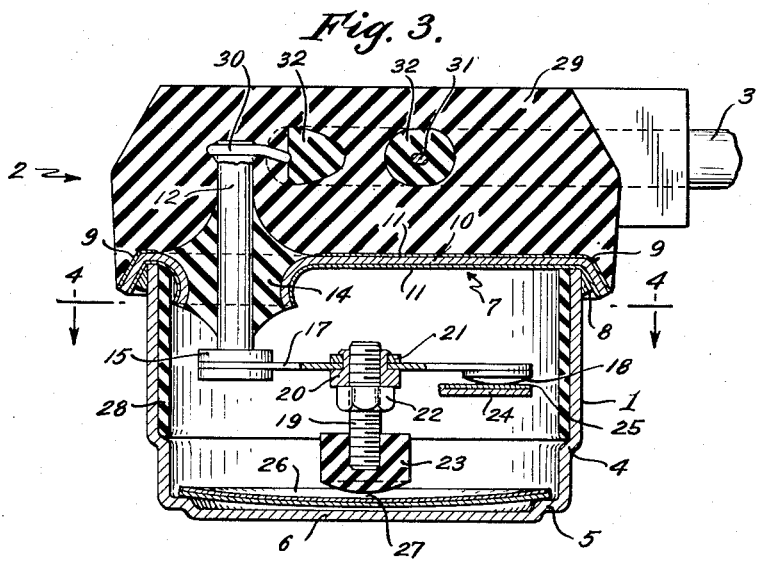
Fig. 3 is a side view in cross section of Fig. 1, taken along sight line 3—3, the parts being shown enlarged for the purpose of clarity.
Figure 4:
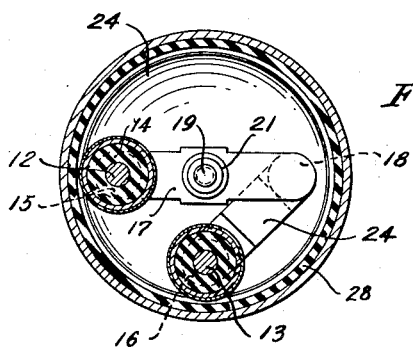
Fig. 4 is a plan view of Fig. 3, taken along sight line 4—4, in order to show certain other details of construction.

Referring to Fig. 3 for the details of construction, container 1 is herein shown as a round cylindrical can of sheet metal having the interior shoulders 4 and 5 provided therein. The bottom of can 1 is closed by bottom 6 as shown which may be an integral part of the can, and the top of can 1 is closed by the header plate indicated generally by numeral 7. Header plate 7 is sealed to can 1 by means of the ring of solder 8 as shown, header plate 7 being inwardly bent at its periphery as shown at 9 in order to provide a recess in which the solder 8 readily flows to seal header plate 7 to can 1.

Header plate 7, made in accordance with known practice, consists of a plate having the main layer 10 of metal, and the terminals 12 and 13 fused therein and insulated therefrom by means of fused insulative medium 14.

The interior ends of terminals 12 and 13 are preferably provided with enlarged heads such as shown at 15 and 16. These heads are thus provided in order to enable the arms 17 and 24 to be welded to the respective terminals without putting stress on the fused insulative medium 14. Of course, if desired, no head need be provided, and the respective arms 17 and 24 may be welded directly to the ends of the terminal. Also, instead of being welded, arms 17 and 24 may be attached to the respective terminals by soldering, using either hard or soft solder.

Flexible contact arm 17 carries at its end the electrical contact 18 which is united to arm 17 either by riveting, soldering, or welding. Threadably attached to the center of arm 17 is a threaded adjusting stem 19. This attachment is preferably made by providing in arm 17 the interiorly threaded bushing 20 which may be attached to arm 17 by means of the washer 21 in the usual fashion, the end of bushing 20 being headed over as shown. Lock nut 22 is provided to keep stem 19 from turning once it has been adjusted as to position. Stem 19 carries at its end the insulating button 23, which may be of some electrical insulating material such as porcelain.

Second contact arm 24 also carries at its free end an electrical contact 25. Contact arms 17 and 24 are so positioned that contact 18 engages contact 25. Arm 17 is so biased that with the thermostatic element 26 in the position shown in Fig. 3, contact 18 engages contact 25.

Resting against the shoulder provided at 5 inside the can 1 is the thermostatic snap-acting disc 26 of the type shown in the J. A. Spencer Patent No. 1,448,240. The operation of this device is such that when heated it snaps to a position which is convex in one direction, and upon cooling it snaps back to its former position which is convex in the other direction. A lost motion space 27 is provided as indicated between the end of insulator 23 and the center of disc 26 in order to prevent initial creep of the thermal element from affecting the engagement of contacts 18 and 25.

If the voltages to be handled are high enough to require it, additional insulation 28 may be provided as shown surrounding the interior of can 1 and resting against the shoulder provided at 4 for that purpose. This may be, for example, insulating paper or varnished cambric.

Attached to the other end of terminals 12 and 13 are the ends of the connectors 3, which are of the usual type having central copper conductors 30 and 31 surrounded by the electrical insulation material 32 on each wire, this insulation material being, for example, rubber or a silicone polymer. This attachment is preferably made by soldering. The insulating material 32 is carried inwardly over header plate 7 as shown. Molded to the top of header plate 7 is the cap 29 of electrical and moisture insulating material such as, for example, rubber or a silicone polymer. (We have shown material 10 of header plate 7 being coated with a layer 11 of brass, since we have found that natural rubber bonds firmly to this electroplated layer provided the brass is freshly cleaned. However, it is not necessary to use this layer of brass, since rubber and silicone polymers may be bonded to metals in some cases without any bonding agent being used, and in other cases by the use of a bonding agent such as is commercially sold on the market today.) As the rubber cap 29 is molded to header plate 7, the rubber insulators 32 on conductors 30 and 31 become tightly bonded to cap 29, thus sealing the connectors and the terminals against the entrance of moisture.

Inasmuch as the pressure of molding cap 29 may be great enough to distort the parts, the molding is done before the assembly of the can 1 or the switch arms 17 and 26. This is done in a mold which is shaped to fully support the other side of header plate 7.

Header plate 7 is first electroplated if electroplating is desired on its surface. Connectors 3 are then soldered to the respective terminals 12 and 13. Cap 29 is then molded on to cover terminals 12 and connectors 3 as described above. Arms 17 and 26 are then attached to terminals 12 and 13, respectively.

It will be seen that in the completed switch, the interior of can 1 is hermetically sealed from exterior atmosphere by means of header plate 7 and solder seal 8; and that the conductors 3 are also sealed in the cap 29 which in turn is firmly bonded to header plate 7. Thus the completed device provides a completely hermetically sealed thermostatic switch. No moisture can get into the can 1, and moisture cannot come into contact with terminals 12 and 13. Furthermore, the construction is such as to enable the header plate, contact arms, and lead-in wires to be made as an integral unit prior to insertion into can 1. The conductors 30 and 31 can be carried outside the refrigerator while covered all the way by rubber insulators 32, and thus the unit as a whole is sealed against moisture.

It will be noticed in this construction that thermostatic disc 26 is closely adjacent to the bottom 6 of can 1. Can 1 is made of thin material, and preferably one that has a fairly high heat conductivity, such as copper, brass, or steel, and thus thermostatic disc 26 senses closely the temperature of bottom 6. Bottom 6 in turn senses closely the temperature conditions on its outside surface. Thus disc 26 is closely responsive to temperature conditions outside bottom 6.

The operation of the device is as follows:

With thermostatic element 26 in the position shown, arm 17 is positioned so that contact 18 is in electrical contact with contact 25 to complete a circuit between terminals 12 and 13. Upon a change of temperature in the proper direction and in the proper amount, element 26 will snap from the position of concavity shown in Fig. 3 to a position of opposite concavity. As it thus changes its shape, thermostatic element 26 will push insulator 23 (and thus adjusting stem 19 and contact arm 17) upward, to separate contact 18 from contact 25, and thus break the electrical circuit between terminals 12 and 13. Upon the required change of temperature in an opposite direction, thermostatic element 26 will again revert to the position of concavity shown in Fig. 3, thus releasing contact arm 17 so that contacts 18 and 25 may again make electrical contact to close an electrical circuit between terminals 12 and 13. It will be understood that element 26 may be so mounted in container 1 that the contacts 18 and 25 will be separated by the change in shape of the element 26 either on its cooling or on its heating, depending upon the particular use to which the switch is to be put.

We have shown the switch members in a single pole single throw construction, but it will be obvious that by the addition of another terminal, with its respective connector and switch arm, the device can be constructed as a single pole double throw switch.

In view of the above, it will be seen that the several objects of the invention are achieved and other advantageous results obtained.

As many changes could be made in the above construction and arrangement of parts without departing from the scope of the invention, it is intended that all matter contained in the above description or shown in the accompanying drawings shall be interpreted as illustrative and not in a limiting sense.

We claim:

1. A hermetically sealed thermostatic switch comprising a container; a header plate hermetically sealing and closing the open end thereof; terminals hermetically sealed to and electrically insulated from said header plate and projecting therethrough from the exterior of said container into the interior thereof; switch means within said container and connected to said terminals so as to make and break an electrical circuit between said terminals; thermally responsive means in said container and positioned to actuate said switch means; electrical conductors attached to said terminals exteriorly of said container, said conductors being covered with moisture-proof electrical insulating material; and a molded moisture-proof electrical insulating cap covering the exterior surface of said header plate, said terminals, and a portion of said moisture-proof electrical insulating material, said cap being bonded to said header plate and to said moisture-proof electrical insulating material, thereby to form a moisture-tight continuous covering for said header plate, terminals, and conductors.

2. A hermetically sealed thermostatic switch comprising a container; a header plate closing the open end of the container; terminals hermetically sealed to and projecting through the header plate from the exterior of the container into the interior thereof, the terminals being electrically insulated from the header plate and having headed portions inside the container; switch means within the container and mounted on said headed portions so as to make and break an electrical circuit between the terminals; thermally responsive means positioned in the container remote from the header plate and positioned to actuate the switch means; electrical conductors attached to the terminals exteriorly of the container, the electrical conductors being covered with moisture proof electrical insulating material; and a moisture-proof and electrical insulating cap covering the exterior surface of the header plate, the terminals, and a portion of the moisture-proof electrical insulating material, thereby to form a moisture-tight continuous covering for said header plate, terminals, and conductors.

3. A hermetically sealed thermostatic switch comprising a container; a header plate closing the open end of the container; terminals hermetically sealed to and projecting through the header plate from the exterior of the container into the interior thereof, the terminals being electrically insulated from the header plate and having headed portions inside the container; a first switch arm mounted on the headed portion of one of the terminals within the container; a second flexible switch arm mounted on the headed portion of another terminal within the container and adapted to make and break an electrical circuit in conjunction with said first switch arm; thermally responsive means positioned in the container remote from the header plate, and positioned to actuate said second switch arm into circuit making and circuit breaking positions; electrical conductors attached to the terminals exteriorly of the container, the electrical conductors being covered with rubber insulating means; and a rubber cap bonded to the exterior surface of the header plate and completely enclosing the terminals, the electrical conductors, and a portion of the rubber insulating means, thereby to form a moisture-tight continuous covering for said header plate, terminals, and conductors.

4. The thermostatic switch of claim 3 in which said thermally responsive means comprises a snap-acting thermostatic disc.

5. A hermetically sealed thermostatic switch comprising a header plate; terminals hermetically sealed to and projecting through the header plate from one side thereof to the other side, the terminals being electrically insulated from the header plate; switch means carried by said terminals on the said one side of the header plate and being connected to said terminals so as to make and break an electrical circuit therebetween; electrical conductors attached to the terminals on the said other side of the header plate and covered with a fluid-resistant electrical insulating material; and a fluid-resistant and electrical insulating cap bonded to said other side of the header plate and covering the surface of said other side, said terminals, and a portion of said fluid-resistant material; the header plate, terminals, switch means, conductors, and cap comprising a unitary subassembly; a container for enclosing said switch means and said one side of the header plate; and thermally responsive means in the container and positioned to actuate said switch means; said header plate and said container being joined together by a hermetic seal with the switch means inside said container.

6. An article of manufacture comprising a header plate; terminals hermetically sealed to and projecting through the header plate from one side thereof to the other side, the terminals being electrically insulated from the header plate; switch means carried by said terminals on the said one side of header plate and being connected to said terminals so as to make and break an electrical circuit therebetween; electrical conductors attached to the terminals on the said other side of the header plate and covered with a fluid-resistant electrically insulating material; and a fluid resistant and electrical insulating cap bonded to said other side of the header plate and covering the surface of said other side, said terminals, and a portion of said fluid-resistant material; the header plate, terminals, switch means, conductors, and cap comprising a unitary subassembly.

7. A thermostatic switch comprising a hermetically sealed enclosure with one side of said enclosure being provided with electrical insulating means; terminals passing through said insulating means; switch means within said enclosure; thermally responsive means within said enclosure for actuating said switch means to make and break an electrical circuit between said terminals; electrical conductors attached to said terminals on the outside of said enclosure, said conductors being covered with moisture-proof electrical insulation; and a molded moisture-proof electrical insulating cap covering said electrical insulating means, said terminals, and a portion of said moisture-proof electrical insulation, thereby to form a moisture-tight continuous covering for said electrical insulating means, terminals, and conductors.

8. A thermostatic switch comprising a hermetically sealed enclosure with one side of said enclosure being provided with electrical insulating means; terminals passing through said insulating means; switch means within said enclosure; thermally responsive means within said enclosure for actuating said switch means to make and break an electrical circuit between said terminals; electrical conductors attached to said terminals on the outside of said enclosure, said conductors being covered with moisture-proof electrical insulation; and a molded moisture-proof electrical insulating cap covering said electrical insulating means, said terminals, and a portion of said moisture-proof electrical insulation and being bonded to said enclosure and to said insulation, thereby to form a moisture-tight continuous covering for said electrical insulating means, terminals, and conductors.

9. A sealed thermostatic switch comprising a container; a closure plate closing the open end thereof; at least two terminals which are electrically insulated from each other being mounted on said plate and projecting therethrough from the exterior of said container into the interior thereof; thermostatic switch means within said container and connected to said terminals so as to make and break an electrical circuit between said terminals; electrical conductors attached to said terminals outside of said container, said conductors being covered with moisture-proof electrically insulating material; and a molded moisture-proof electrically insulating cap covering at least the exterior surface of said closure plate, said terminals, and a portion of said moisture-proof electrically insulating material, said cap being bonded to said moisture-proof electrically insulating material, thereby to form a moisture-tight continuous covering for said terminals and conductors.

JOHN O. MOORHEAD.
EDWARD F. KURTZ.
ROBERT M. GLIDDEN.

References Cited in the file of this patent

UNITED STATES PATENTS

| Number | Name | Date |
| --- | --- | --- |
| 1,918,071 | Watts | July 11, 1933 |
| 2,238,881 | Evans | Apr. 22, 1941 |
| 2,265,360 | Dessart | Dec. 9, 1941 |
| 2,519,025 | Crise | Aug. 15, 1950 |
| 2,574,698 | Hall | Nov. 13, 1951 |